US006480580B1

(12) United States Patent
Beswick et al.

(10) Patent No.: US 6,480,580 B1
(45) Date of Patent: Nov. 12, 2002

(54) USER ADDRESSABLE COMPUTER TELEPHONY SYSTEM

(75) Inventors: Antony Paul Beswick, Tustin; Shelley Lam Uyeno, Brea, both of CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/160,371

(22) Filed: Sep. 24, 1998

(51) Int. Cl.[7] .............................. H04M 1/64; H04M 3/42
(52) U.S. Cl. ................ 379/88.13; 379/67.1; 379/88.19; 379/88.21; 379/201.01; 379/201.06; 379/201.07; 379/207.12
(58) Field of Search ...................... 379/67.1, 85, 88.01, 379/88.02, 88.04, 88.07, 88.12, 88.13, 88.14, 88.18, 93.05, 93.09, 93.11, 93.12, 9.15, 93.17, 93.23, 100.01, 142.1, 156, 170, 171, 201.07, 201.08, 201.1, 207.12, 88.19, 88.21, 201.6, 201.01; 704/270, 275, 257, 260, 271

(56) References Cited

U.S. PATENT DOCUMENTS

| 5,206,901 | A | * | 4/1993 | Harlow et al. ............... 379/211 |
| 5,325,421 | A | * | 6/1994 | Hou et al. ................. 379/88.03 |
| 5,327,486 | A | * | 7/1994 | Wolff et al. ............... 379/93.23 |
| 5,509,062 | A | * | 4/1996 | Carlsen ...................... 379/210 |
| 5,550,907 | A | * | 8/1996 | Carlsen ...................... 379/207 |
| 5,572,643 | A | * | 11/1996 | Judson ....................... 395/793 |
| 5,590,178 | A | * | 12/1996 | Murakami et al. ........ 379/93.18 |
| 5,652,789 | A | * | 7/1997 | Miner et al. ................. 379/201 |
| 5,719,921 | A | * | 2/1998 | Vysotsky et al. ........ 379/88.01 |
| 5,862,207 | A |   | 1/1999 | Aoshima ..................... 379/201 |
| 5,884,262 | A | * | 3/1999 | Wise et al. .................. 704/270 |
| 5,946,386 | A | * | 8/1999 | Rogers et al. .............. 379/265 |
| 5,953,392 | A | * | 9/1999 | Rhie et al. ............... 379/88.13 |
| 5,958,014 | A | * | 9/1999 | Cave .......................... 709/229 |
| 6,058,366 | A | * | 5/2000 | Tarkiainen et al. ......... 704/270 |
| 6,064,730 | A | * | 5/2000 | Ginsberg .................... 379/265 |
| 6,144,938 | A | * | 11/2000 | Surace et al. .............. 704/257 |

FOREIGN PATENT DOCUMENTS

EP 0 719 059 A2 12/1995

OTHER PUBLICATIONS

Regnier et al, "Personal Communication Services—The New POTS", Proceedings of The Global Telecommunications Conference and Exhibition (Globecom), Us, New York, IEEE, vol. —pp. 420–426.

* cited by examiner

*Primary Examiner*—Allan Hoosain
(74) *Attorney, Agent, or Firm*—Jenkens & Gilchrist, P.C.

(57) ABSTRACT

Improved methods and arrangements are provided that allow for dynamic mapping of users to devices in a computer telephony system. The computer telephony system is configured to allow users to select any access device therein, regardless of location or type. The user then logs into the computer telephony system through the selected access device by identifying who they are, for example, by stating their name. Within the computer telephony system, the user's telephony characteristics are then dynamically assigned to the selected access device. As such, subsequent calls to the user are directed to the selected access device.

24 Claims, 4 Drawing Sheets

USER ADDRESSABLE COMPUTER TELEPHONY SYSTEM

BACKGROUND OF THE INVENTION

1. Technical Field of the Invention

The present invention relates generally to communications systems, and more specifically to methods and arrangements for use in computer telephony systems that allow a party to be dialed or otherwise addressed by name, or other like identifier, irrespective of the actual physical terminal or access device utilized by the user.

2. Description of Related Art

Computer telephony systems are becoming increasingly popular because they provide specific services, which in the past would have been cost prohibitive if provided by traditional telephone systems. Essentially, a computer telephony system includes technologies that actively integrate computers and like devices to function as would a traditional telephone system and/or private branch exchange (PBX), but only on a smaller scale and/or at a significantly lower cost. While a computer telephony system can be a stand alone communication system, for example within a home or small business environment, it is more likely to also be connected to existing telecommunications systems, such as a public switched telephone network (PTSN), and/or other data networks, such as a local area network (LAN). As such, most computer telephony systems are configured to provide users with several communication related features. Indeed, the inherent flexibility of a programmable computer telephony system allows for specialized and/or customized communication features to be provided, often with only a modest attendant increase in cost.

Of particular interest within computer telephony systems is the increased demand from users to integrate new and different types of devices and the need to support the portability of these devices. The increase in demand for mobile cellular radio telephones, personal digital assistants (PDAs), pagers, e-mail services, and facsimile services are prime examples of the changing requirements that users present, even in a small home and/or small business environment.

The resources available within a computer telephony system are uniquely positioned to meet the future needs of these service-rich users. To support these and other types of needs, however, there is a need to make the computer telephony system's resources easier to access and use, especially for mobile users.

Currently, within a typical computer telephony system, to complete a telephone call it is necessary to determine the types of services available to each of the users and to assign at least one access device to each of the users. This can be accomplished, for example, be creating a table or database that includes the various service features, other restrictions and/or device assignments to users.

By way of a further example, such a database can include identifiers specifying that a "first user" is permitted to place local calls, but restricted from placing international calls. The data bases would further include one or more identifiers for the access device or devices assigned to the first user. For example, the first user may be assigned to a wireless handset that is arranged to communicate through "extension number 114" within the computer telephony system. This database is typically populated by technicians during an initial set-up stage, and can be modified from time to time as needs change.

With this example in mind, to place a call to the "first user", it is necessary to first dial the main number (if external) and then to input the first user's extension, namely "114". This type of system is essentially a dial by number system.

A more complex, but user friendly computer telephony system may include a dial by voice capability in which a call to a shared number, for example, is handled by a voice recognition system. The calling party then states the name of the called party and the voice recognition system interprets the name and, using the database, maps or otherwise determines that the call is for extension "114". In this example, the database essentially provides a static mapping function between a name and an assigned access terminal.

One of the drawbacks to these types of systems is that the system, and in particular the database therein, is not flexible enough to allow for dynamic changes to the assignment of users to access devices. Having a more flexible system would allow users to be more mobile, and to switch from access device to access device, for example, without loss of service.

Thus, as can be appreciated, there is a need for improved methods and arrangements that provide a more flexible and dynamic allocation of resources without compromising the services being provided.

SUMMARY OF THE INVENTION

In accordance with certain aspects of the present invention, improved methods and arrangements are provided for dynamically associating or otherwise allocating resources for use by specified users. The improved methods and arrangements enhance the function of the computer telephony system, without compromising the services being provided, by allowing users to essentially log into the computer telephony system from any selected access device, therein. A user can log into the computer telephony system, for example, by simply identifying who they are using a voice input. Once a user is logged into the computer telephony system, the selected device is configured to receive all incoming calls for the user.

Thus, by way of example, the above stated needs and others are met by an arrangement for use in a communications system, in accordance with certain embodiments of the present invention. The arrangement includes a processor and at least one user device that is configured to provide user inputs to the processor and to provide outputs from the processor to a user. The arrangement also includes a dynamic allocation map that defines at least one user and the user device. The arrangement further includes a user interface that is configured to dynamically associate the user with the user device in response to the user inputs.

In accordance with other embodiments, the dynamic allocation map also includes at least one user characteristic that is associated with the user and, as such, is assigned to the user device.

The user inputs preferably include user voice inputs that identify the user. As such, in certain embodiments, the user interface also includes an automatic speech recognition (ASR) engine that is configured to analyze the user voice inputs, and/or a text-to-speech (TTS) engine that is configured to generate speech outputs suitable for outputting to the user.

In accordance with still other embodiments of the present invention, an apparatus is provided for use in a communications system. The apparatus includes a dynamic allocation map defining at least one user and at least one user device, and a user interface that configured to dynamically associate the user with the user device in response to at least one user input.

A method for use in a communications system is also provided in accordance with certain embodiments of the present invention. The method includes the steps of generating a dynamic allocation map that defines at least one user and at least one user device, receiving user voice inputs identifying the user, and dynamically associating the user with the user device in response to the user voice inputs. In accordance with further embodiments, the step of generating the dynamic allocation map further includes defining at least one user characteristic associated with the user, and the step of dynamically associating the user with the user device further includes dynamically associating the user characteristic with the user device.

BRIEF DESCRIPTION OF THE DRAWINGS

A more complete understanding of the methods and arrangements in accordance with certain embodiments of the present invention may be had by reference to the following detailed description when taken in conjunction with the accompanying drawings wherein.

DETAILED DESCRIPTION OF THE PRESENTLY PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
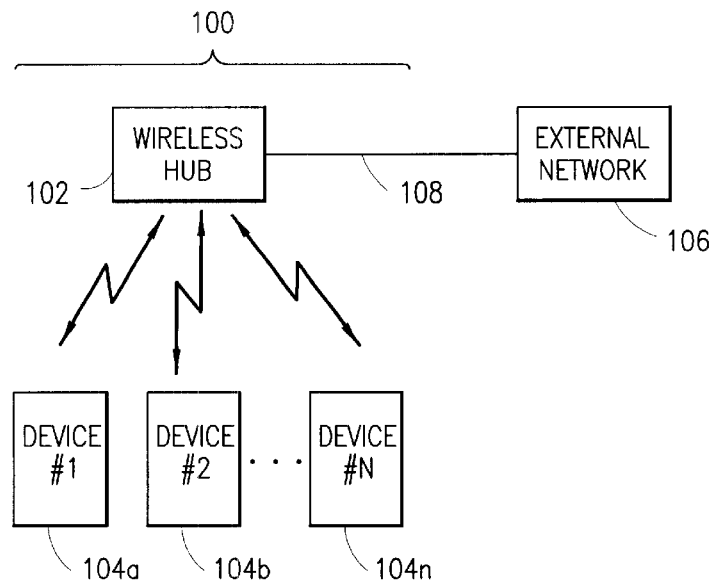
FIG. 1 is a block diagram depicting a telephony arrangement having a wireless hub arrangement that is arranged to provide telephony functions, in accordance with certain embodiments of the present invention.

FIG. 1 is a block diagram depicting a computer telephony system 100 that is arranged to provide voice and/or data communications to a plurality of local users. In order to accomplish this task, computer telephony system 100 includes a hub 102 that is arranged to provide telephony functions to a plurality of users through devices 104a–n. As depicted, hub 102 is depicted as providing wireless communications to a plurality of users, through devices 104a–n. Although not shown, hub 102 can also be arranged to support wired communications to other devices.

As depicted, hub 102 is connected to at least one external network 106 through one or more wire or fiber lines 108. In other embodiments, lines 108 can also include wireless connections. In this manner, computer telephony system 100 is configured to provide telephony services through one or more telecommunications networks. Hub 102, therefore, provides the signal interfacing, switching, monitoring, and controlling functions as required to support the various telephony services, features and operations.

By way of example, in accordance with certain embodiments of the present invention, external network 106 can be any type of communications network that is arranged to provide communications with remote users and/or devices, such as, a public switched telephone network (PTSN). Additionally, external network 106 in certain further embodiments includes or otherwise provides an interface to other external network resources such as an intranet and/or the Internet.

Devices 104a–n can include any type of communication device that is configured for accessing a computer telephony system. By way of example, device 104a can be a wireless telephone or pager type of device, device 104b can be a modem-configured computing device such as a portable computer or personal digital assistant type of device. Devices 104a–n are typically configured to transmit and receive (i.e., exchange) information in the form of either analog or digital data through hub 104, lines 108 and the various resources provided by external network 106.

Figure 2:
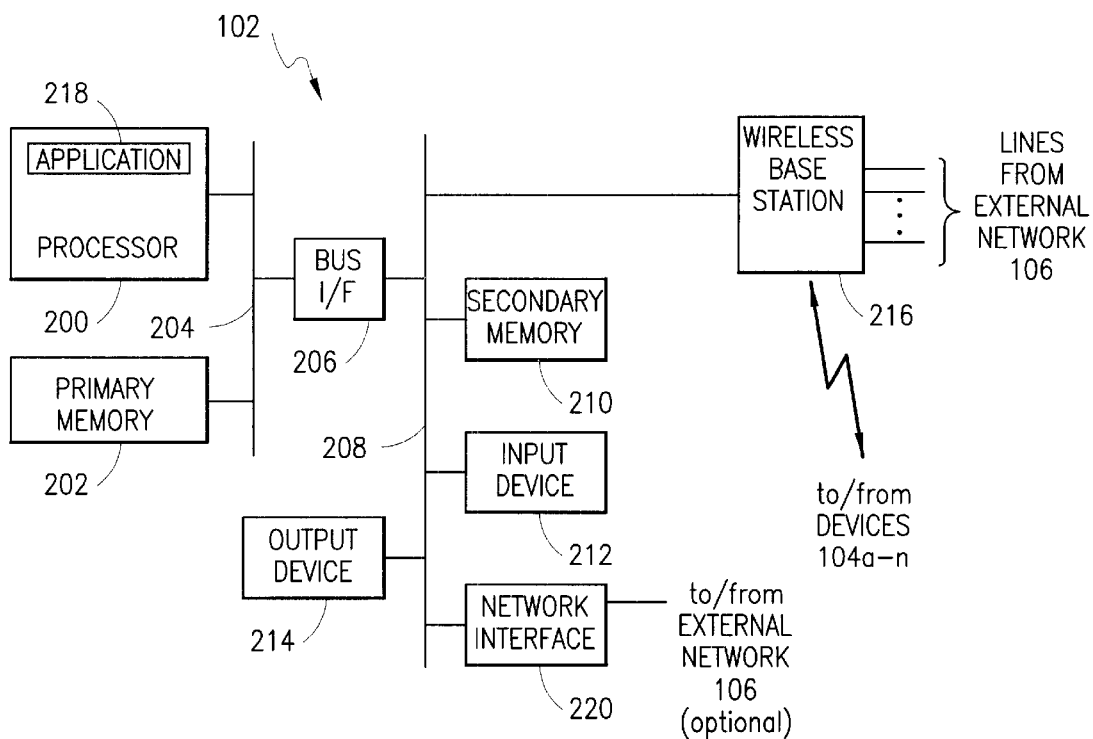
FIG. 2 is a block diagram depicting an exemplary wireless hub arrangement, as in FIG. 1, having a computer system configured to run a telephony application, a base station device, and at least one user device, in accordance with certain embodiments of the present invention.

FIG. 2 is a block diagram depicting an exemplary hub 102 that is based primarily on a computer architecture, such as, for example, that found in a contemporary personal computer (PC) or like computer system. Indeed, in accordance with certain preferred embodiments of the present invention, hub 102 includes a conventional PC that is connected to a base station 216 and configured to run one or more telephony applications, including, for example, a telephony application that supports dial by name services.

Referring to the exemplary embodiment depicted in FIG. 2, within hub 102 there is at least one processor 200 that is connected to a primary memory 202 through a first bus 204. Processor 200, for example, can be a microprocessor, such as a Pentium II microprocessor available from Intel Corporation of Santa Clara, Calif. Processor 200 is configured to access primary memory 202 through first bus 204. Primary memory 202 includes random access memory (RAM), such as, dynamic random access memory (DRAM), which is configured to store data associated with at least one telephony application 218 that runs in processor 200.

As shown in FIG. 2, first bus 204 is further interfaced to a second bus 208, through a bus interface (I/F) 206. By way of example, second bus 208 can be a Universal Serial Bus (USB), a Peripheral Component Interconnect (PCI) bus, an Industry Standard Architecture(ISA)bus, or other similar bus.

A plurality of devices can be connected to second bus 208. For example, as depicted, a secondary memory 210 can be connected to second bus 208 to provide additional data storage. Secondary memory 210 can include, for example, additional RAM, DRAM, static random access memory (SRAM) (e.g., flash memory), a disk or tape drive and associated magnetic or optomagnetic storage medium, an optical storage drive and optical storage medium, or other like storage device.

At least one input device 212 is also connected to second bus 208 and configured to accept inputs from an operator. Input device 212 can include, for example, a keyboard device, a mouse device, a trackball device, a pen device, a pointing device, a touch sensitive input device, a microphone device, or other like input device. The inputs from input device 212 are then provided to processor 200, application 218, or any of the other applicable connected devices in FIGS. 1 and 2.

At least one output device 214 is also connected to second bus 208. Output device 214 is configured to generate an output suitable for use by a user (with or without additional devices) in response to one or more signals from processor 200. By way of example, output device 214 can include a cathode-ray tube (CRT) generated display, flat panel display, a printer, an audio monitor, or other like devices. In accordance with certain preferred embodiments of the present invention, output device 214 includes a display device such as a CRT or flat panel display.

Hub 102 also includes a base station 216 that is configured to support telephony operations within computer telephony system 100. As shown, base station 216 is connected to second bus 208. Base station 216 includes, for example, a switch matrix and associated processing and/or interface circuitry (not shown). In a wireless hub arrangement 100, such as that depicted in FIG. 1, control device 216 also includes transceiver circuitry that supports the wireless communications to/from devices 104a–n. Base station 216 also provides an interface to lines 108.

Base station 216 is configured to exchange information and to respond to one or more commands from application 218 to selectively control the switch matrix as required to support various telephony operations. To accomplish this, base station 216 is configured to provide status information about the telephony operations, e.g., information about a call, and status information about or from the various devices 104a–n.

An optional network interface device 220 is also connected to second bus 208 to provide additional telephony communications, such as, voice over Internet Protocol (VOIP), and/or non-telephony communications between processor 200, for example, a local area network (LAN) (not shown).

Although second bus 208 is depicted as connecting several different devices to first bus 204 and processor 200, it is to be understood that this is only an exemplary configuration, and that certain additional embodiments in accordance with the present invention use a plurality of buses, direct interfaces, and/or shared interfaces between the various devices.

Further, it is to be understood that additional devices can be connected to or otherwise provided in hub 102 as needed to support wired or wireless communications and/or other networking capabilities.

Figure 3:
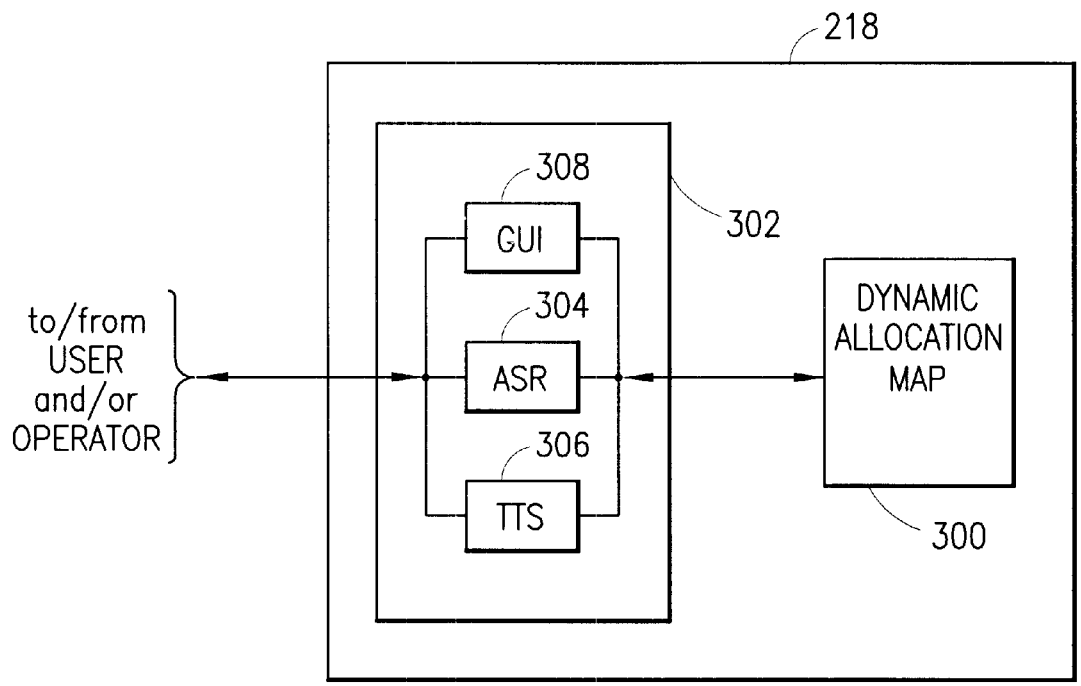
FIG. 3 is a functional block diagram depicting a telephony application, as in FIG. 2, having a user interface that includes a graphical user interface (GUI), an automatic speech recognition (ASR) engine and a text-to-speech (TTS) engine, and a dynamic allocation map, in accordance with certain embodiments of the present invention.

FIG. 3 depicts relevant portions of an exemplary telephony application 218 that is configured to operate substantially within processor 200. Application 218 is configured with a dynamic allocation map 300, which is accessible through a user interface 302. User interface 302 includes an automatic voice recognition (ASR) engine 304, a text-to-speech (TTS) engine 306 and a graphical user interface (GUI) 308. ASR 304 is configured to receive user inputs, for example, voice or keypad inputs from devices 104 or line 106 (via base sation 216, etc.). The received voice or keypad inputs are then interpreted (e.g., sampled, analyzed, processed, and/or compared) within user interface 302 and by using dynamic allocation map 300. Other user inputs can be received from an input device 212, such as, for example, an operator's console, using GUI 308. TTS engine 306 is configured to support the various functions of user interface 302, for example, by providing text-to-speech outputs via either device 104 and/or output device 214.

Dynamic user interface 302 and allocation map 300 are arranged to provide positive control over the user's, resources and calling processes associated with the computer telephony system, while also allowing users the flexibility to selectively access the system in a variety of ways and using a variety of resources (e.g., access devices).

Thus, for example, a user can select an access device (104) and then simply logs into the system using the selected access device. In accordance with certain preferred embodiments of the present invention, the user logs into the system by voice inputs that are interpreted and processed by user interface 302, for example, using ASR engine 304 and other logic. When a user logs into the system, dynamic allocation map 300 is updated or otherwise revised to identify that the user is accessing the system from a particular access device.

When dynamic allocation map 300 is updated the applicable characteristics associated with the user are temporarily assigned to the particular device. This updating process is fully automated such that, for example, a user need only select an access device (104) and identify who they are by voice. The updating process then verifies the identification and updates dynamic allocation map 300, thereby assigning the identified user's characteristics to the device. Subsequent calls to the user will then be routed to the selected device or an associated telephony service as identified for the user in updated dynamic allocation map 300.

Figure 4:
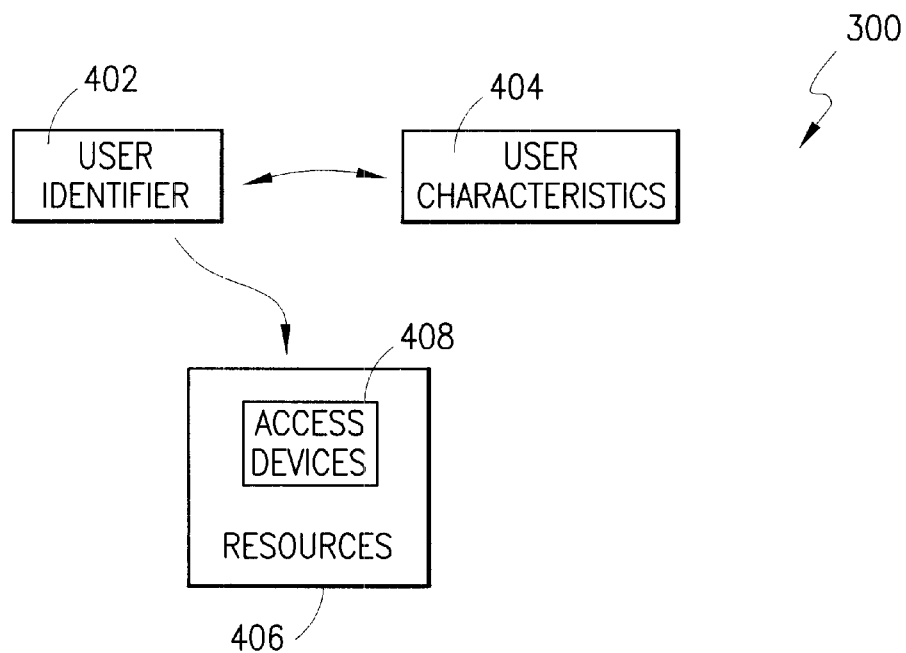
FIG. 4 graphically depicts a dynamic allocation map, as in FIG. 3, defining a user identifier, user characteristics and resources, such as , an access device, in accordance with certain embodiments of the present invention.

With this in mind, FIG. 4 depicts a functional block diagram of a portion of an exemplary dynamic allocation map 300. As shown, within dynamic allocation map 300 there is defined a user identifier 402 that is linked or otherwise logically tied to one or more corresponding user characteristics 404. User characteristics 404 can include telephony features, services, restrictions, limitations, options, class of service, and the like, which are associated with the user.

The linking of the user identifier 402 (e.g., a named user) with the user characteristics 404 can be established during an initial set-up procedure, for example, from an operator's console or other access device. User characteristics 404 can also be established or otherwise modified by either an operator or the user at a later time, again using either an operators console or an access device.

When a user logs into the system, an additional logical link is made between the user identifier 402 and the access device being used. As shown, in FIG. 4, dynamic allocation map 300 includes resource identifiers 406 that includes access device identifiers 408. Thus, there is depicted a logical link between user identifier 402 and the access device identifier 408 that temporarily assigns user characteristics 404 to access device identifier 408. Access device identifier 408 can include specific connectivity information about the access device, for example, the type of device and the extension or port number of the device. In this manner, subsequent calls to the user identified by user identifier 402 will be routed to access device 408.

When the user moves to another area, for example, and logs into the system using another access device (104) then an update to dynamic allocation map 300 will be conducted within application 218 to re-assign user characteristics to the newly selected access device.

Figure 5:
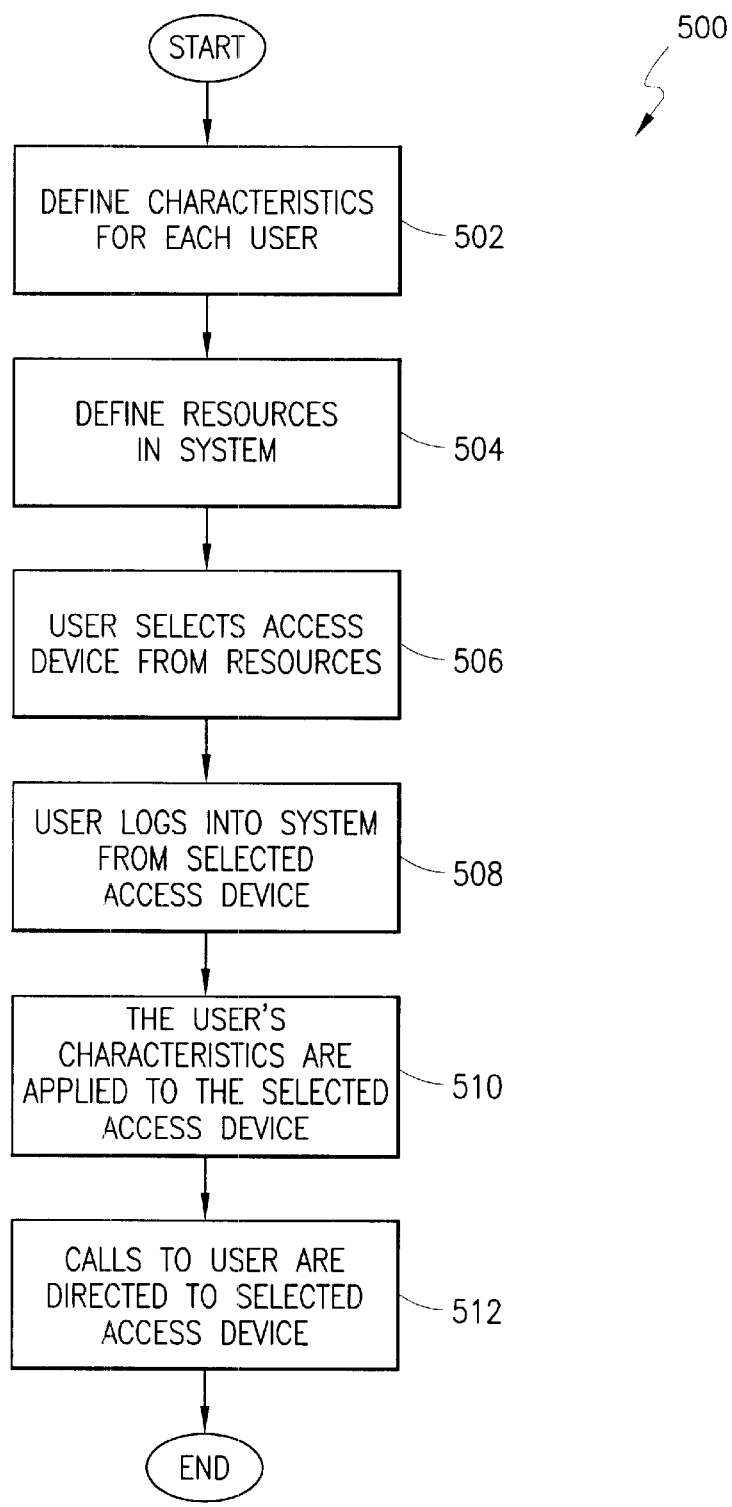
FIG. 5 is a flow-chart depicting an exemplary dynamic allocation mapping process, in accordance with certain embodiments of the present invention.

FIG. 5 is a flow-chart depicting an exemplary dynamic allocation mapping process 500 for use with application 218, in accordance with certain exemplary embodiments of the present invention. In step 502, characteristics are defined for each of the users. Similarly, in step 504, which can be conducted at the same time as step 502 or prior thereto, the various telephony resources are defined. Once steps 502 and 504 have been completed, then the computer telephony system 100 is ready to support the users telephony needs.

In step 506, a user selects an access device from among the various resources defined in step 504. Next, in step 508, the user logs into the computer telephony system 100 from the selected access device (e.g., 104a). Then, as depicted in step 510, the user's characteristics, as defined in step 502, are applied to the selected access device. Subsequent calls to the user are then directed to the selected access device, as depicted in step 512.

Figure 6:
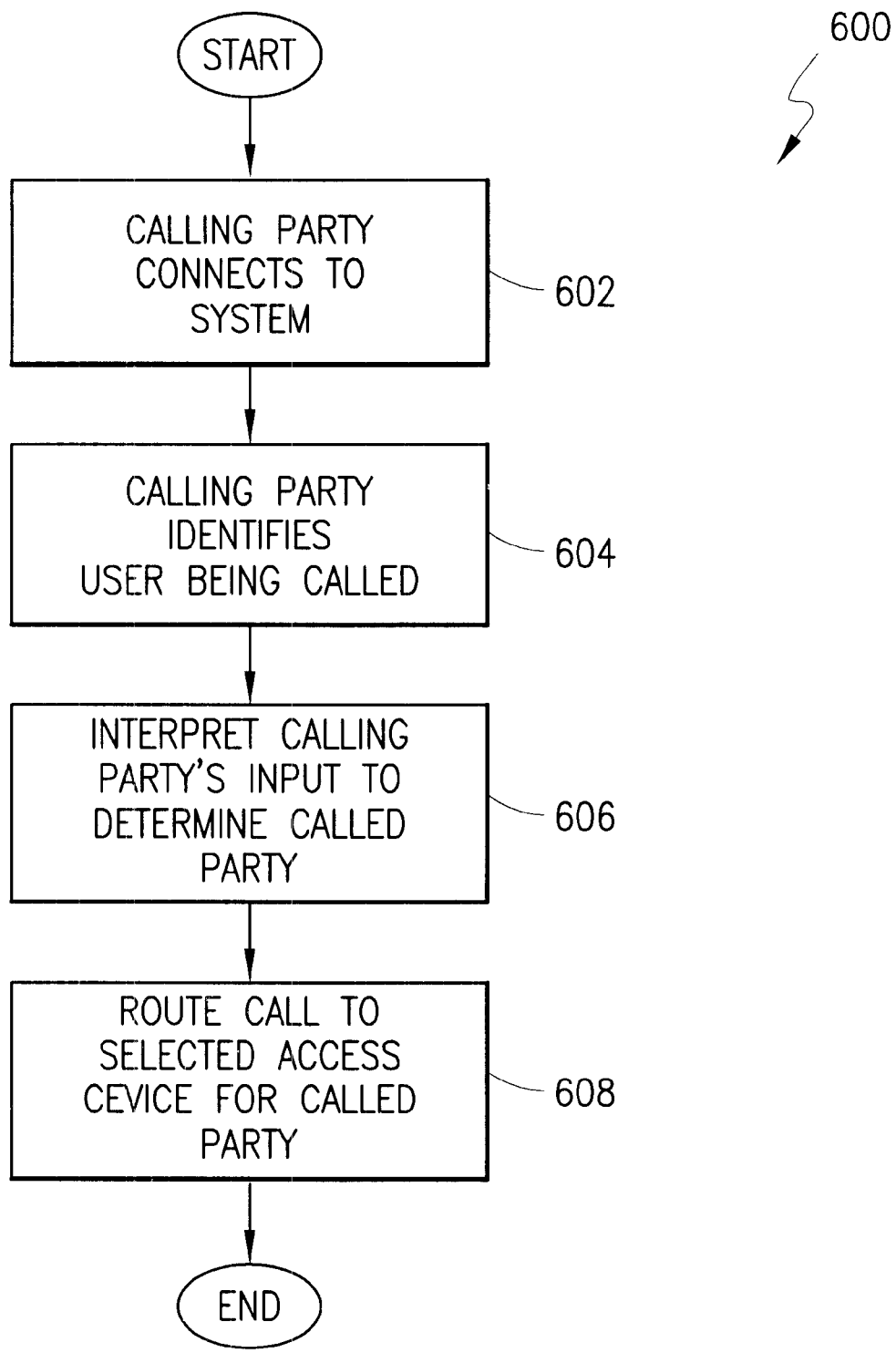
FIG. 6 is a flow-chart depicting an exemplary calling process, in accordance with certain further embodiments of the present invention.

FIG. 6 is a flow-chart depicting an exemplary calling process 600 for use with application 218, in accordance with certain exemplary embodiments of the present invention. In step 602, the calling party connects to computer telephony system 100. Next, in step 604, the calling party identifies, for example, by stating the user's name, the user being called. In step 606, the identity of the called party is then determined, for example, by interpreting the voice input from the calling party from step 604. In step 608, the call is then directed to the selected access device or other telephony service (e.g., voice mail) for the called party.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. An arrangement for use in a communications system, the arrangement comprising
   a processor connected to a plurality of user telephonic devices
   a dynamic allocation map accessible to the processor and configured to link a select one of a plurality of users with a select one of said plurality of user telephonic devices during a user log-in;
   a user interface configured at least partially within the processor to receive user inputs from said select user during said user log-in at said select user telephonic device to dynamically associate said select user with said select user telephonic device within said dynamic allocation map; and
   whereby subsequent incoming communications directed to said select user are forwarded to said select user telephonic device based, at least in part, on the dynamic association between said select user and said select user telephonic device within the dynamic allocation map.

2. The arrangement as recited in claim 1, wherein the dynamic allocation map further comprises at least one user characteristic that is associated with said select user and assigned to said select user telephonic device.

3. The arrangement as recited in claim 2, wherein the user inputs include user voice inputs that identify said select user.

4. The arrangement as recited in claim 3, wherein the user interface further comprises an automatic speech recognition (ASR) engine that is configured to analyze the user voice inputs.

5. The arrangement as recited in claim 3, wherein the user interface further comprises a test-to-speech (TTS) engine that is configured to generate speech outputs suitable for outputting to said select user from said select user telephonic device.

6. The arrangement as recited in claim 1, wherein said select user moves to another area and logs into the communications system using a different one of the plurality of user telephonic devices, and an update to the dynamic allocation map is conducted to re-assign user characteristics of said select user to the different user telephonic device.

7. The arrangement as recited in claim 6, wherein said user characteristics are previously established and, prior to the update to the dynamic allocation map, are assigned to said select user telephonic device.

8. An apparatus for use in a communications system having a processor connected to a plurality of user telephony devices, the apparatus comprising:
   a dynamic allocation map accessible to the processor and configured to link a select one of a plurality of users with a select one of said plurality of user telephony devices during a user log-in;
   a user interface configured to receive user inputs from said select user during said user log-in at said select user telephony device to dynamically associate said select user with said select user telephony device within said dynamic allocation map; and
   whereby subsequent incoming communications directed to said select user are transferred to said select user telephony device based, at least in part, on the link between said select user and said select user telephony device within the dynamic allocation map.

9. The apparatus as recited in claim 8, wherein the dynamic allocation map further comprises at least one user characteristic that is associated with said select user and assigned to said select user telephony device.

10. The apparatus as recited in claim 9, wherein the user inputs include user voice inputs that identify said select user.

11. The apparatus as recited in claim 10, wherein the user interface further comprises an automatic speech recognition (ASR) engine that is configured to analyze the user voice inputs.

12. The apparatus as recited in claim 10, wherein the user interface further comprises a text-to-speech (TTS) engine that is configured to generate speech outputs suitable for outputting to said select user from said select user telephony device.

13. The apparatus as recited in claim 8, wherein said select user moves to another area and logs into the communications system using a different one of the plurality of user telephony devices and a new link in the dynamic allocation map is created to re-assign user characteristics of said select user to the different user telephony device.

14. The apparatus as recited in claim 13, wherein the user characteristics are previously established and, prior to creation of the new link are assigned to said select user telephony device.

15. A computer readable medium for use with a computer system having a processor connected to a plurality of user telephony devices, the computer readable medium comprising computer instructions that:
   establish a dynamic allocation map within the processor to link a select one of a plurality of users with a select one of said plurality of user telephony devices during a user log-in;
   invoke a user interface configured to receive user inputs from said select user during said user log-in at said select user telephony device to dynamically associate said select user with said select user telephony device within said dynamic allocation map; and whereby subsequent incoming communications directed to said select user are transferred to said select user telephony device based, at least in part, on the link between said select user and said select user telephony device within the dynamic allocation map.

16. The computer readable medium as recited in claim 15, wherein the dynamic allocation map further comprises at least one user characteristic that is associated with said select user and assigned to said select user telephony device.

17. The computer readable medium as recited in claim 16, wherein the user inputs include user voice inputs that identify said select user.

18. The computer readable medium as recited in claim 17, wherein the user interface further comprises an automatic speech recognition (ASR) engine that is configured to analyze the user voice inputs.

19. The computer readable medium as recited in claim 17, wherein the user interface further comprises a text-to-text speech (TTS) engine that is configured to generate speech outputs suitable for outputting to said select user from said select user telephony device.

20. The computer readable medium as recited in claim 15, wherein said select user moves to another area and logs into the communications system using a different one of the plurality of user telephony devices and a new link in the dynamic allocation map is created to re-assign user characteristics of said select user to the different user telephony device.

21. The computer readable medium as recited in claim 20, wherein the user characteristics are previously established and, prior to creation of the new link, are assigned to said select user telephony device.

22. A method for use in communications system, the method comprising:

generating a dynamic allocation map within a processor connected to a plurality of user telephonic devices, wherein the dynamic allocation map links a select one of a plurality of users with a select one of said plurality of user telephonic devices during a user log-in;

receiving user inputs from said select user during said user log-in at said select user telephonic device; and dynamically associating within the dynamic allocation map said select user with said select user telephonic device in response to the user inputs received via said select user telephonic device;

whereby subsequent incoming communications directed to said select user are forwarded to said select user telephonic device based, at least in part, on the dynamic association between said select user and said select user telephonic device within the dynamic allocation map.

23. The method as recited in claim 22, wherein the step of generating the dynamic allocation map further comprises defining at least one user characteristic that is associated with said select user, and the step of dynamically associating further includes dynamically associating the at least one user characteristic with said select user telephonic device.

24. The method as recited in claim 23, further comprising the steps of:

logging into the communications system, by said select user using a different one of the plurality of user telephonic devices; and updating the dynamic allocation map by dynamically associating said select user characteristic with the different user telephonic device.

\* \* \* \* \*